Sept. 27, 1927.
J. B. BENSON
CLAMPING DEVICE
Filed Feb. 13, 1926
1,643,737
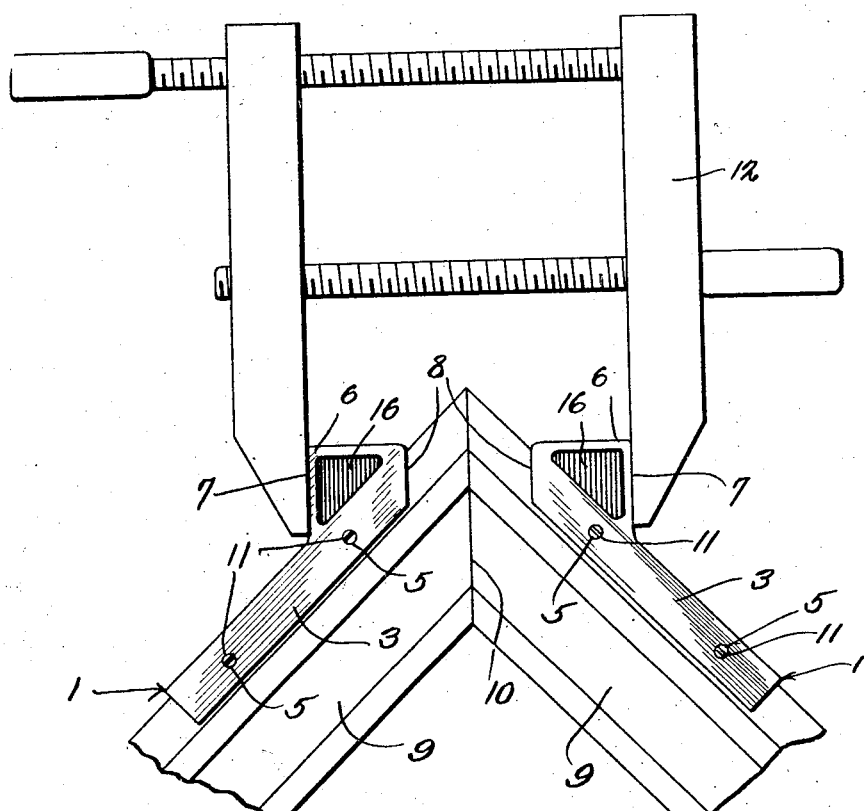
Fig.1.
Fig.2.
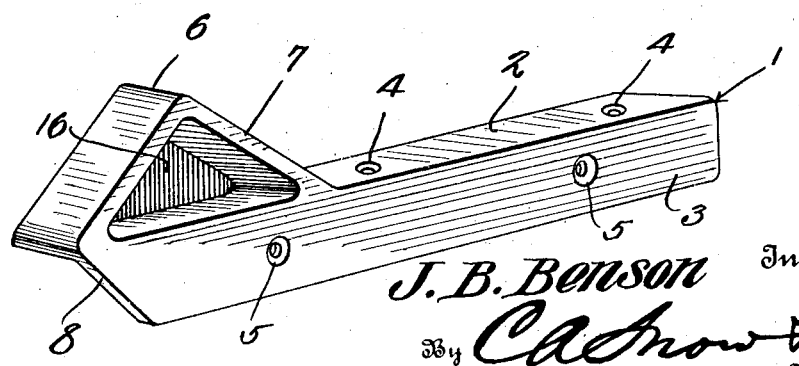
J.B. Benson Inventor
By C.A.Snow & Co.
Attorneys.

Patented Sept. 27, 1927.

1,643,737

UNITED STATES PATENT OFFICE.

JOHN B. BENSON, OF INDEPENDENCE, KANSAS.

CLAMPING DEVICE.

Application filed February 13, 1926. Serial No. 88,052.

This invention aims to provide a means whereby two pieces of material, disposed at right angles to each other, or nearly so, and having bevelled meeting ends, may be held together whilst the glue on said ends is setting, the device being attractively simple in structure, and embodying few parts, and none that are likely to get out of order.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in plan, a device constructed in accordance with the invention; and Figure 2 is a perspective view showing one of the brackets.

In carrying out the invention, there is provided a pair of brackets, each bracket being made of metal, preferably, and being in the form of an angle member 1 having flanges 2 and 3 which are disposed at right angles to each other. Openings 4 are fashioned in the flange 2, and the flange 3 is supplied with openings 5. Lugs 6 project from the flange 2 at one end of the angle member 1 and come out flush with the outer surface of the flange 3. The lug 6 may be made hollow, as indicated at 16, to save metal, and to facilitate the handling of the angle member 1. The outer surfaces 7 of the lugs 6 are located at 45° of the length of the angle member 1. The ends 8 of the angle members 1 are cut off in parallel relation to the outer surfaces 7 of the lugs 6.

The numeral 9 designates two pieces of material, which are cut off or bevelled along a line 10, at an angle of about 45°, so that the pieces 9 may be disposed at right angles to each other or about at right angles to each other. The angle members 1 are placed on the pieces 9 of material, the flanges 3 overlapping the sides of the pieces 9, and the flanges 2 overlapping the edges of the pieces 9. Screws 11 or other securing elements are used to hold the angle members 1 on the pieces 9 of material. The screws 11 are placed in the holes 5, or in the holes 4, as the operator may desire, and the location of the screws in the holes 4 or 5 will depend upon which surface of the material it is desired to have perfect, and which surface of the material, the operator is willing to mar a little, by the insertion of the screws 11.

When the brackets 1 are mounted on the pieces 9 of material, as hereinbefore described, the outer surfaces 7 of the lugs 6 are parallel to each other, and are parallel to the line of abutment 10 between the pieces 9 of material. The parallel surfaces 7 of the lugs 6 are engaged by a clamp of any desired kind. In the drawings, there is shown a double-jaw screw clamp 12, but some other sort of a clamp may be used if considered expedient. It is obvious that, by means of a clamp of any desired sort, cooperating with the lugs 6 as hereinbefore described, the abutting ends 10 of pieces 9 of material will be held together whilst the glue is drying. Because the surfaces 7 of the lugs are parallel to each other, and parallel to the abutting surfaces 10 of the pieces 9 of material, the force applied by the clamp acts at right angles to the abutting edges 10 and has no component which tends to slide the pieces 9 upon each other in a direction parallel to the abutting surfaces 10. Because the angle members 1 are cut off on a bevel at their ends, as shown at 8, those ends may be set up as closely as desired to the line of abutment 10 between the pieces 9 of material.

The device forming the subject matter of this application may be manufactured at a cost of a few cents, and may be used with any kind of a handy clamp, as and for the purpose described, the structure being characterized throughout by extreme simplicity.

What is claimed is:—

In a clamping device, a pair of angle members, and means for securing them to the articles to be clamped together, the angle members being supplied at their extreme inner ends with lugs, the lugs having approximately parallel clamp-engaging surfaces, and the lugs approximating right triangles in shape.

In testimony that I claim the foregoing as my own, I have hereto affixed my signature.

JOHN B. BENSON.